(12) United States Patent
Shaw

(10) Patent No.: US 6,746,512 B1
(45) Date of Patent: Jun. 8, 2004

(54) HYDROMETALLURGICAL EXTRACTION OF COPPER AND OTHER VALUABLE METALS

(75) Inventor: Raymond Walter Shaw, New Gisborne (AU)

(73) Assignee: Technological Resources Pty. Ltd., Melbourne (AU)

( * ) Notice: Subject to any disclaimer, the term of this patent is extended or adjusted under 35 U.S.C. 154(b) by 0 days.

(21) Appl. No.: 09/763,817
(22) PCT Filed: Aug. 24, 1999
(86) PCT No.: PCT/AU99/00679
§ 371 (c)(1), (2), (4) Date: Jul. 27, 2001
(87) PCT Pub. No.: WO00/11228
PCT Pub. Date: Mar. 2, 2000

(30) Foreign Application Priority Data

Aug. 24, 1998 (AU) .............................................. PP5437

(51) Int. Cl.$^7$ ................................................. C22B 3/08
(52) U.S. Cl. ............................................ 75/743; 75/744
(58) Field of Search .................................. 75/743, 744

(56) References Cited

U.S. PATENT DOCUMENTS

| | | |
|---|---|---|
| 4,032,330 A | 6/1977 | Fountain et al. |
| 4,115,221 A | 9/1978 | Wadsworth et al. |
| 4,138,248 A | 2/1979 | Narain |
| 4,337,128 A | 6/1982 | Haakonsen et al. |
| 4,676,828 A | 6/1987 | Andre |
| 4,971,662 A | * 11/1990 | Sawyer et al. .............. 205/581 |

FOREIGN PATENT DOCUMENTS

| | | |
|---|---|---|
| WO | WO 94/00606 | 6/1993 |
| WO | WO 96/19593 | 6/1996 |
| WO | WO 96/41026 | 12/1996 |
| WO | WO 96/41027 | 12/1996 |
| WO | WO 98/39491 | 9/1998 |

OTHER PUBLICATIONS

Derwent Abstracts Accession No. 98–018951/02, ZA 9701307 A, Oct. 29, 1979.

* cited by examiner

Primary Examiner—Melvyn Andrews
(74) Attorney, Agent, or Firm—Merchant & Gould, P.C.

(57) ABSTRACT

A hydrometallurgical process for extracting copper and any one or more than one of zinc, silver and gold from a sulphide ore or concentrate is disclosed. The process includes a range of mineral species that contain copper and one or more than one of zinc, silver and gold, which process includes two or more than two leach steps using each liquors of different composition, each leach step selectively leaching one or more than one metal from the minerals. The process also includes separating a solid residue and an exit leach liquor after each leach step, leaching the solid residue produced in each leach step in a successive leach step, and recovering metal from the exit leach liquor produced in each leach step.

77 Claims, 5 Drawing Sheets

HYDROMETALLURGICAL EXTRACTION OF COPPER AND OTHER VALUABLE METALS

The present invention relates to hydrometallurgical extraction of copper and other valuable metals from sulphide ores and concentrates.

The present invention relates particularly, although by no means exclusively, to hydrometallurgical extraction of copper and one or more than one of the metals zinc, gold and silver from sulphide ores and concentrates.

There are limited known hydrometallurgical options for treating copper sulphide ores and concentrates to extract copper.

The bulk of copper produced hydrometallurgically on a commercial basis is from solvent extraction and electrowinning plants based on acid heap leaching of ore or from bacterially assisted dump leaching of low grade sulphuric wastes.

However, heap leaching is not a commercial option for a number of ores, particularly those containing refractory sulphide minerals such as chalcopyrite. Heap leaching of chalcopyrite ($CuFeS_2$) ores results in poor recoveries and low extraction rates which in turn lead to the need for large leach areas and low copper content in the pregnant liquor for the solvent extraction and electrowinning steps. The non-recovery of gold is also a deterrent in cases where there is the option to produce a concentrate. Residual copper largely prevents further processing to recover gold in the heap.

Heap leaching is also not practised for zinc recovery from sulphide ores because of the difficulty in obtaining a liquor suitable for subsequent economic recovery of the zinc.

The three hydrometallurgical processes with most potential for chalcopyrite-rich sulphides are currently the Intec process, the BHAS process, and the related Cominco (CESL) process. Successful laboratory and/or pilot testing of these three processes has been reported. The processes all rely on the presence of chloride to improve the leaching efficiency for chalcopyrite without excessive attack on pyrite and oxidation of sulphur to sulphate. The BnAS/Cominco processes use conventional solvent extraction/electrowinning technology to recover copper, whereas the Intec process uses a particular novel chloride electrowinning step which produces copper powder. The BRAS process has been operated successfully on a chalcocite ($Cu_2S$) like feed for more than ten years. However, the Intec, BRAS, and Cominco processes have not been operated commercially for chalcopyrite ores or concentrates.

There has also been considerable development of processes based on using high pressure and temperature (>200C) oxidative acid sulphate leaching of copper concentrates. These have not been commercially successful presumably because of the high costs associated with the conversion of the sulphur present to sulphate and the difficulties with economic recovery of gold and silver present from the residue using conventional cyanide based technology.

There is also active development of sulphate-based solvent extraction/electrowinning processes based on ferric sulphate leaching, low temperature oxidative pressure leaching, and bio-leaching. These processes are largely targeting the more readily leached sulphide minerals, such as chalcocite, rather than the more difficult to leach ores, such as chalcopyrite. There are no known commercial copper operations using any of these technologies.

An object of the present invention is to provide an alternative process for economic treatment of copper containing sulphide ores and/or concentrates which also contain associated valuable metals such as zinc, gold or silver.

According to the present invention there is provided a hydrometallurgical process for extracting copper and any one or more than one of zinc, silver and gold from a sulphide ore or concentrate which includes a range of mineral species that contain copper and one or more than one of zinc, silver and gold, which process includes two or more than two leach steps using leach liquors of different composition, each leach step selectively leaching one or more than one metal from the minerals, separating a solid residue and an exit leach liquor after each leach step, leaching the solid residue produced in each leach step in a successive leach step, and recovering metal from the exit leach liquor produced in each leach step.

It is preferred that the process of the present invention includes 2 or more of the leach steps summarised below which are tailored to selectively attack minerals so that each metal is recovered through a leach step (or steps) that is suitable to the minerals and the leach steps are complementary in terms of allowing materials transfer between them without one step being detrimental to and seriously interfering with the next step. The leach steps are set out below in order of increasing aggressiveness.

1. A ferric sulphate leach step to extract copper from chalcocite ($Cu_2S$) in the sulphide ore or concentrate. This leach enables use of simple atmospheric reactors, gives good copper extraction, and allows regeneration of the leachate using bacteria or pressure oxidation of the liquor. This leach step will also dissolve part of any zinc that is present and some of the slightly more refractory copper minerals but is not ideally suited to high zinc feed. This leach does not dissolve gold or silver which remain in the residue.

2. A pressure oxidation leach in acid sulphate media with oxygen injection to extract zinc from sphalerite (ZnS). In the sulphide ore or concentrate as a first leach step or a leach step on the solids product of the ferric sulphate leach step. This leach step was originally developed by Sherritt-Gordon. This leach can also potentially dissolve copper from primary sulphides but is not very efficient for more refractory minerals such as chalcopyrite. Copper which leaches may be removed from the liquor with solvent extraction or alternatively may be precipitated into the residue by maintaining a moderately high pH (around 4) and then re-leached using one or other of the alternative leach steps. This leach does not dissolve silver or gold.

3. A mixed chloride-sulphate leach to extract copper from copper rich concentrates containing valuable levels of refractory sulphide minerals such as chalcopyrite in the sulphide ore or concentrate as a first leach step or as a leach step on the solids product of the ferric sulphate or the pressure oxidation leach steps and not amenable to leaching in sulphate-only systems. This leach step will dissolve virtually all copper sulphide minerals and zinc from sphalerite. Silver and gold remain in the residue.

4. A halex leach as described in the Intec process to extract copper, silver and gold from solids products materials. This leach step is described as part of the Intec process where it is used to leach chalcopyrite and produce copper powder through a chloride electrowinning step. This leach will dissolve all zinc and copper minerals as well as the silver and gold.

5. An oxidative acid sulphate high pressure, high temperature leach carried out at over 200C such that much of the sulphur present is converted to sulphate and copper and zinc present are leached into the liquor. This leach step has been described in numerous publications such as those, of Dreisinger, or as part of a Sherritt-Cominco process. Although this leach is more aggressive to the sulphur and copper than even the halex leach it does not dissolve the gold or silver. In the invention proposed it is potentially used as an alternative to leach step 3 in special circumstances where there is a wish to deliberately convert significant amounts of the sulphur to sulphate.

The capability of the more aggressive leach steps summarised in items 3,4 and 5 above to dissolve more of the valuable metals does not of itself mean that it is preferable to use them as a substitute for the multi-staged approach of the present invention. These more aggressive leach steps have penalties associated with the complexity of the leach and the cost of subsequent metal recovery. Leach steps 3 and 4 both include chlorides which prevent simple direct electrowinning of zinc and requires use of solvent extraction which is not to date very efficient for zinc. Similarly the need for tonnage oxygen and the greater complexity of using pressure vessels and/or chloride resistant construction detracts from the use of these more aggressive leach steps if the copper-containing minerals present are readily leachable in a simple ferric sulphate liquor.

BRIEF DESCRIPTION Of THE DRAWINGS

The present invention is described further by way of example with reference to FIG. 1 which are flow sheets of preferred embodiments of the process of the present invention.

The process illustrated in FIG. 1 combines the 4 leach steps summarised in items 1 to 4 above and is applicable to sulphide ores and concentrates that include chalcocite ($Cu_2S$), sphalerite ($ZnS$), chalcopyrite ($CuFeS_2$). gold and silver.

Figure 1:
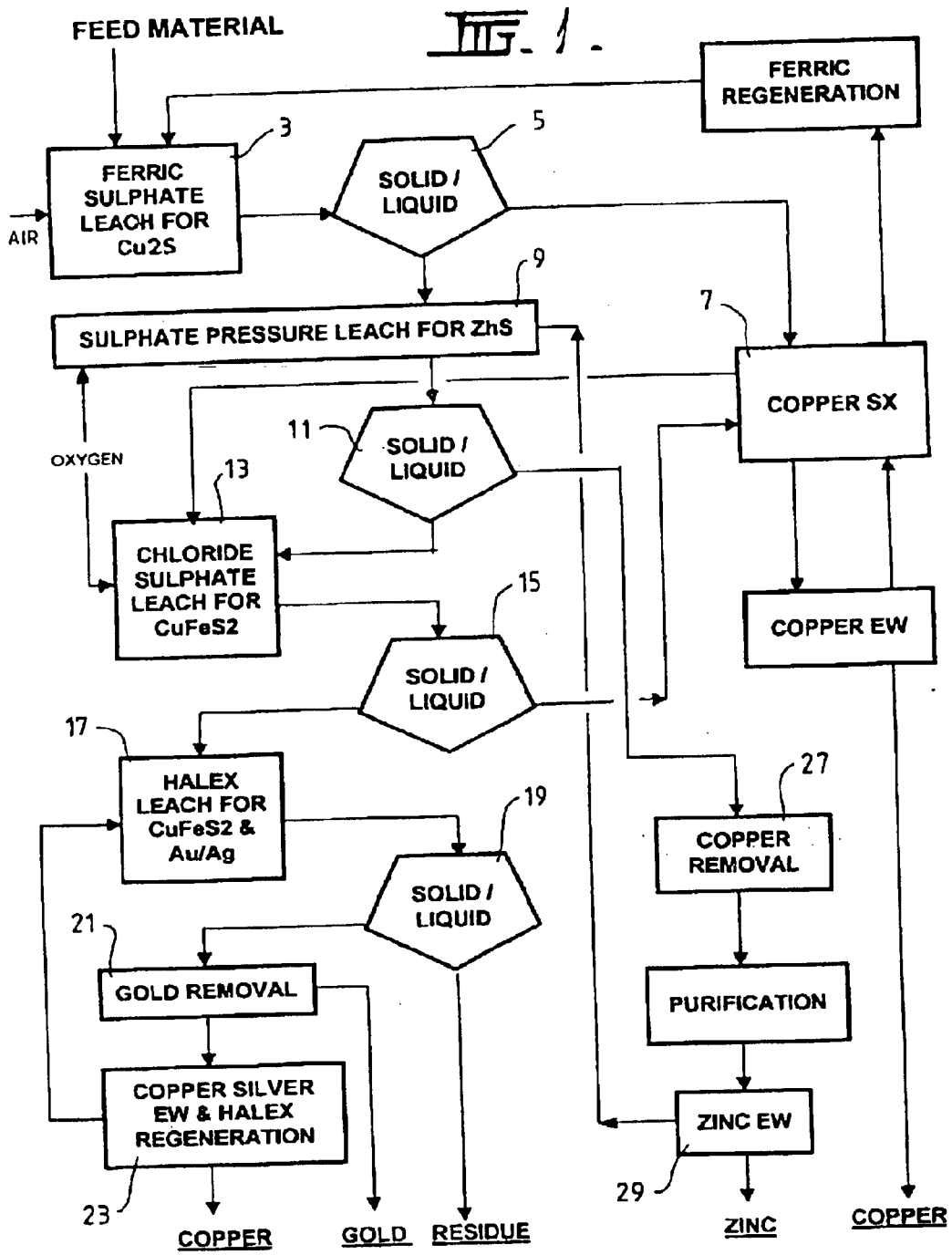

The feed material is initially leached in ferric sulphate leach 3 to dissolve the readily-leached copper. The time, temperature and oxidation potential of this leach are controlled such that copper is selectively extracted over zinc. Some zinc dissolution may occur leading to a build up in the circuit but this can be balanced by the soluble zinc contained in the entrained liquor fed to the subsequent leach stages with the solid residue.

The solids are separated from the liquor in a solid/liquid separation step 5 and the liquor is then transferred into an electrolyte for copper electrowinning in a solvent extraction step 7.

Ferric ions are partially converted to ferrous during the ferric sulphate leach 3 and the majority of the ferrous ions are regenerated to ferric ions and returned to the ferric sulphate leach 3 using bacteria or pressure oxidation. The leach and the regeneration can be carried out simultaneously in one pressure vessel but this has penalties in complexity of equipment and also-in possible lack of selectively of the leach.

The solid residue from the solid/liquid separation step 5 is leached in a sulphate pressure leach 9 in an acid sulphate liquor with injection of oxygen at elevated pressure and temperature (around 150 psi, 150C) to dissolve the zinc present and to give a solution suitable for purification and zinc electrowinning.

The transfer of residual sulphate and iron from the ferric sulphate leach 3 into this leach does not cause difficulties as the sulphate pressure leach is also sulphate based and is capable of precipitating the iron as jarosite and/or goethite. This leach would be as currently practiced in existing commercial plants unless there is excessive copper present in the liquor due to inadequate washing from the ferric sulphate first leach 3, or because the feed material has minerals present such as bornite which are midway in reactivity between chalcocite and chalcopyrite. Alternative approaches are to force the copper in liquor to precipitate by pushing the pH up to where the cupric ions present become much less soluble or to add a specific copper extraction step such as solvent extraction into the circuit to economically recover the copper. The final traces of copper could then be removed using the conventional cementation reaction in the zinc dust purification step.

The presence of elevated levels of copper in the zinc liquor as would occur if this leach step was used directly on a copper zinc ore can lead to some difficulties in subsequent processing. Removing this copper by solvent extraction generates acid in the zinc liquor which requires neutralisation prior to final purification and electrowinning. Although this neutralisation can be done with lime which generates gypsum there is a significant cost penalty associated. The approach of a combined leach of the copper and zinc is therefore generally not favoured for a stand alone operation. At specific locations there may be scope to overcome this problem through having available zinc oxide such as from a conventional roast-leach circuit, or a copper free zinc sulphide concentrate, for this "neutralisation". In that situation there is scope to consider using this pressure leach step to extract both the readily leachable copper and the zinc.

Part of the zinc in the feed material may leach during the ferric sulphate leach 3 but this does not transfer across the copper solvent extraction step 7 and goes to the sulphate pressure leach step 9 in the liquor which accompanies the solid residue from the solid/liquid separation step 5.

In cases where the zinc is extremely reactive there may be a need to neutralise some liquor to force more zinc out and prevent it building to an unacceptably high level. An alternative is to remove the zinc from part or all of the raffinate liquor from copper solvent extraction using zinc solvent extraction and to transfer it into a conventional high zinc acid sulphate solution for electrowinning. This may require prior removal of any residual cupric ions present in the liquor being fed to zinc solvent extraction using cementation and/or ion exchange.

The product of the sulphate pressure leach 9 is transferred to a solid/liquid separation step 11.

The liquor from the solid/liquid separation step 11 is transferred successively to copper removal 27, purification, and zinc electrowin 29.

The solid residue from the solid/liquid separation step 11 contains undissolved copper present in refractory minerals such as chalcopyrite plus the precious metals silver and gold. It also contains any oxide waste materials from the original feed material, unreacted waste sulphides such as pyrite, elemental sulphur, and precipitated iron in the form of jarosite and/or goethite arising during the leach reactions.

The solid residue from the solid/liquid separation step 11 is leached in a mixed acid chloride-sulphate leach 13 to extract the copper without redissolving the iron compounds or significantly attacking any pyrite present. The chloride-sulphate leach 13 avoids converting much of the elemental sulphur to sulphate. Once again forward transfer of sulphate containing liquor is not of major concern because of the sulphate base of the mixed chloride sulphate step. Any untoward build up of sulphate can be accommodated by deliberate precipitation preferably as a jarosite or through limited amounts of gypsum using lime/limestone additions.

The product of the chloride-sulphide leach 13 is transferred to a solid/leach separation step 15.

The copper-bearing liquor from the solid/liquid separation 15 is subjected to solvent extraction 7 to transfer the copper to a sulphate liquor for conventional electrowinning. If the liquor contains significant zinc due to inefficiencies in the sulphate pressure leach 9 there may be advantages including a zinc solvent extraction step to also transfer the zinc into a sulphate liquor for electrolysis. This may require first removing all of the cupric ions from the liquor probably through solvent extraction followed by ion exchange and/or cementation with zinc. An alternative where chloride is present in the liquor is to reduce the cupric ions to cuprous and rely on the chloride ions present to allow this to be stable in the liquor. The leach would oxidise these cuprous ions to cupric and allow recovery when the liquor is recycled for use.

In unusual circumstances where the ore or concentrate contains significant levels of acid consuming minerals, and/or there is a site specific need to produce some sulphuric acid at a greater rate than the small amount which arises in the chloride sulphate leach, there may be advantages in substituting a high pressure, high temperature leach (as discussed as leach type 5) for the chloride-sulphate leach 13. The remainder of the flowsheet would remain unaltered with the copper leached still being recovered via solvent extraction and the residue proceeding to the next step 15.

The solid residue from the solid/liquid separation step 15 contains gold and silver and a small amount of undissolved copper. This residue is leached in a halex leach 17 to extract gold, silver and residual copper into solution. Small amounts of residual liquor transferred from the preceding leaches is readily managed by precipitation of the contained sulphates as gypsum using lime/limestone. Residual chloride is compatible with the halex leach solution and is not of concern.

The liquor and the residual solids are separated in a liquid/solid separation step 19 and the solids are washed and neutralised for disposal. The liquor from the solid/liquid separation step 19 is then passed through carbon columns 21 to extract gold.

There may be a need to partially treat the liquor with metallic copper or another reductant prior to entry to the carbon columns 21 to ensure the redox potential is of the right order for the gold to transfer onto the carbon.

The gold depleted liquor from the carbon columns 21 is then fed into an electrowinning cell 23 to recover the copper and silver and regenerate the halex. The cell is designed so that the halex and cupric ions generated at the anode are largely prevented from returning to the cathode. This can be achieved as is done in many industries through the use of ion selective membranes as physical barriers. An alternative approach is to design of the cell geometry in terms of inlet and outlet arrangement, the use of stirrers and baffles and the possible inclusion of porous membranes such that the electrolyte predominantly flows from the vicinity of the cathode to that of the anode without backflow or back mixing.

There are a number of alternatives for this part of the process depending upon the relative amounts of the copper and silver, and also on other impurity elements that may be present. The preferred approach is to electrowin the copper and silver directly from the liquor without prior purification. This would give an impure product and also consume more power than is the case where halex leaching is being used as the primary copper production but avoids additional processing steps. The copper product in this arrangement would need further treatment to give normal high purity copper and recover the silver. This can be done using conventional copper electrorefining by melting the powder and casting it into anodes. In special cases there may be advantages in removing the silver from the liquor prior to electrowinning and purifying the liquor as proposed in the published Intec process to give a higher purity copper powder product for direct sale. This may also be beneficial if there are significant levels of mercury present in the feed to ensure it reports to a solid residue rather than into the copper metal.

In some situations, there may be advantages in reacting this liquor with a small amount of reactive copper material such as scrap metal, but if these were unavailable even a reactive primary sulphide such as chalcocite, to take advantage of the residual oxidative power and convert the majority of the cupric ions present to cuprous prior to electrowinning.

The flowsheet of FIG. 1 covers the case where the feed material contains both of the most common copper minerals plus economically significant levels of zinc, silver and gold. This is not always the case and the process can readily be modified based around the criteria of including the leach steps most suitable for the specific minerals present.

The flowsheets of FIGS. 2 to 5 are examples of modified processes, as summarised below.

Figure 2:
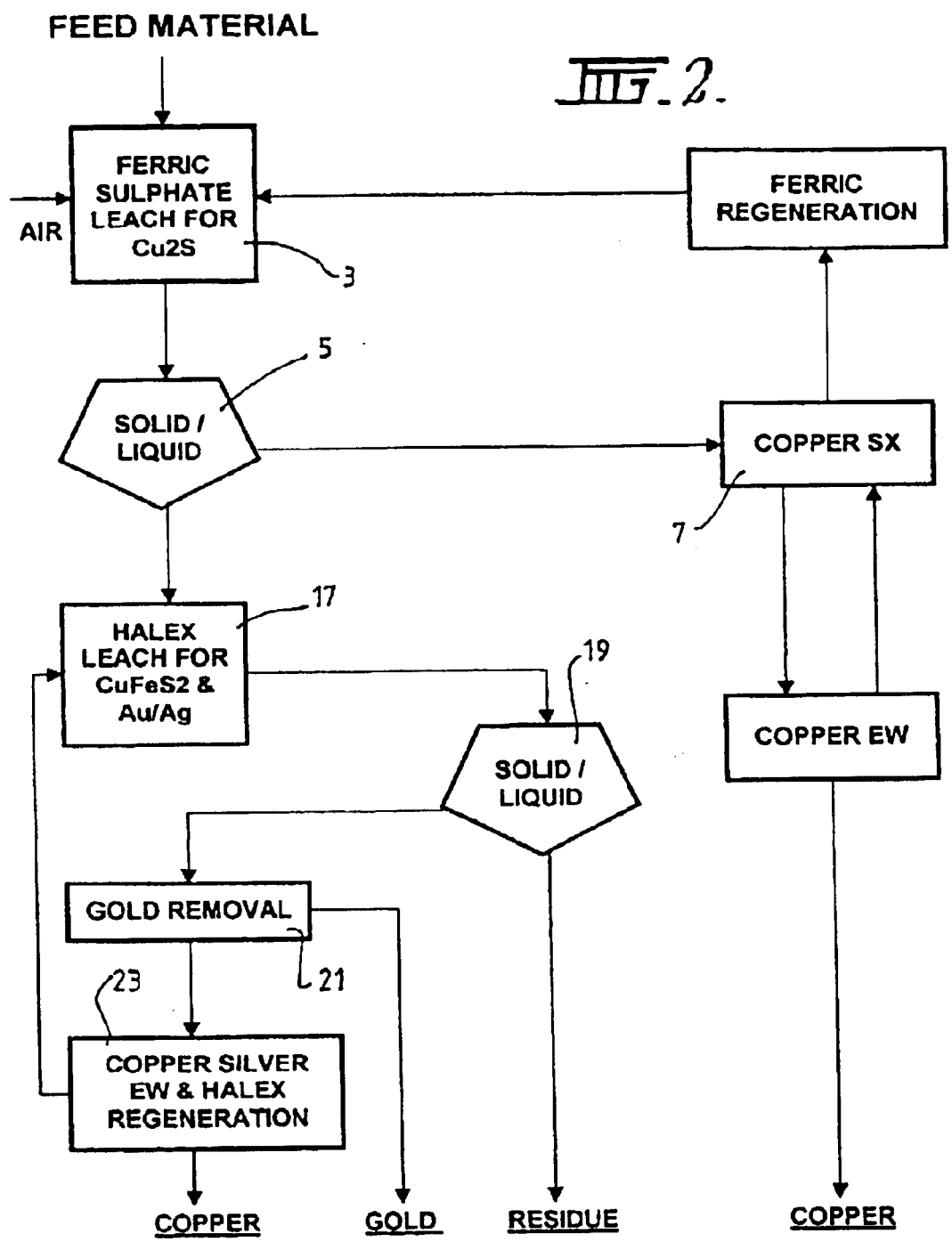

FIG. 2: $Cu_2S$—Au/Ag feed material.
The process includes the ferric sulphate leach for the majority of the copper followed by the halex leach for the residual copper and the silver and gold.

Figure 3:
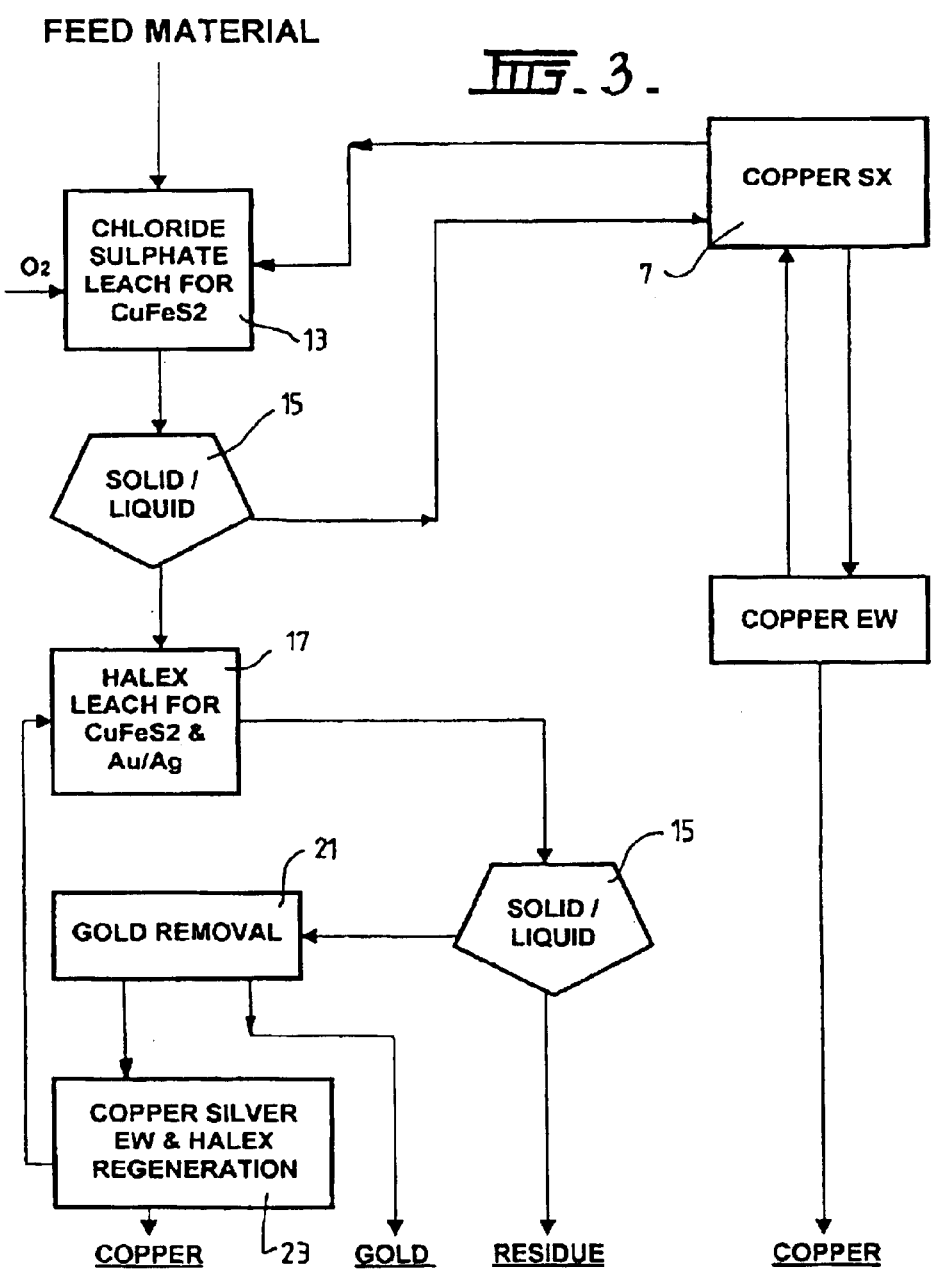

FIG. 3: $CuFeS_2$—Au/Ag feed.
The process includes the chloride-sulphate leach for the majority of the copper followed by the halex leach for the residual copper and silver and gold.

Figure 4:
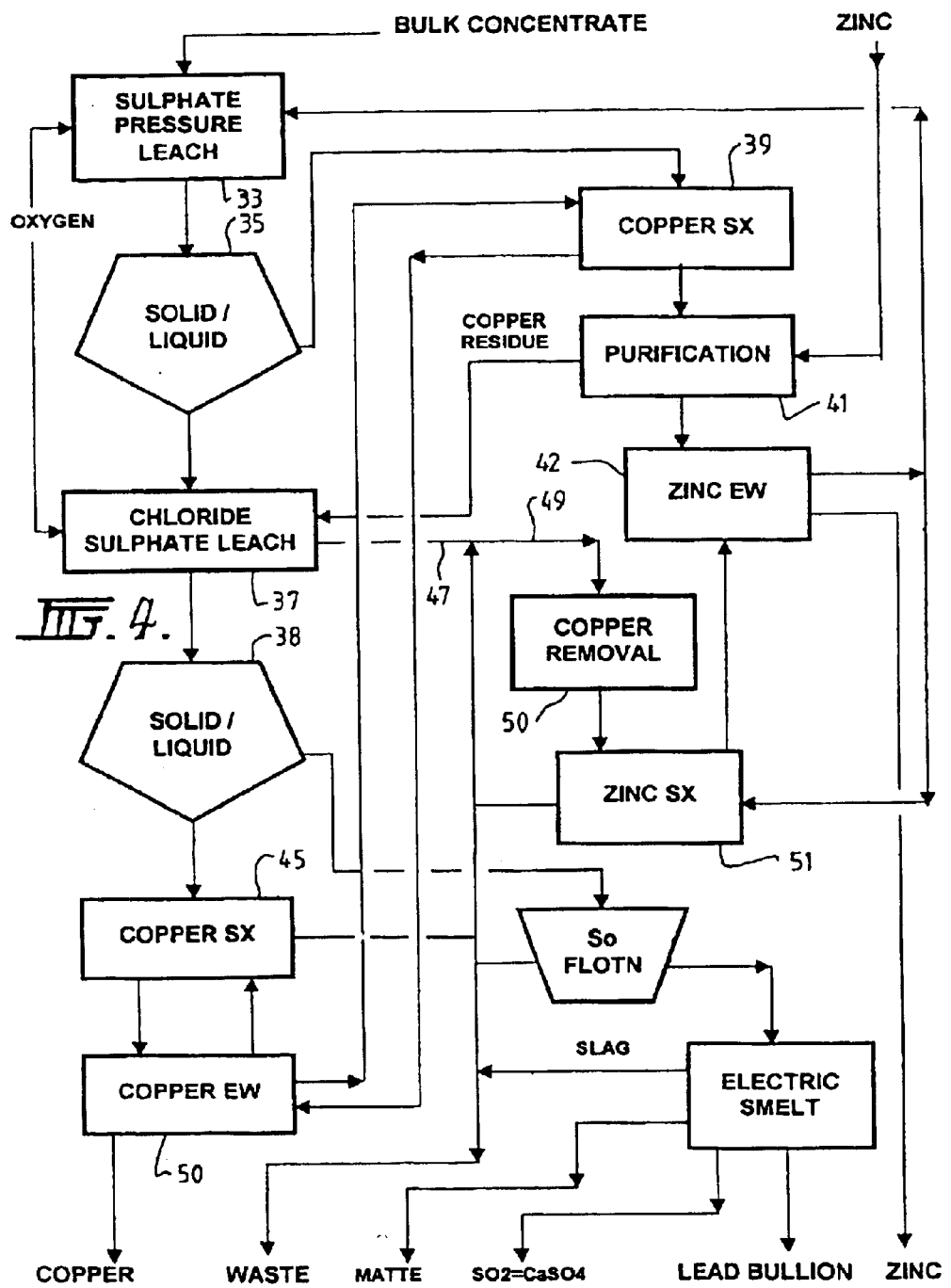

FIG. 4: ZnS—$CuFeS_2$ feed without Au/Ag.
The process includes sulphate pressure leach for the zinc followed by a chloride-sulphate leach for the copper.

Figure 5:
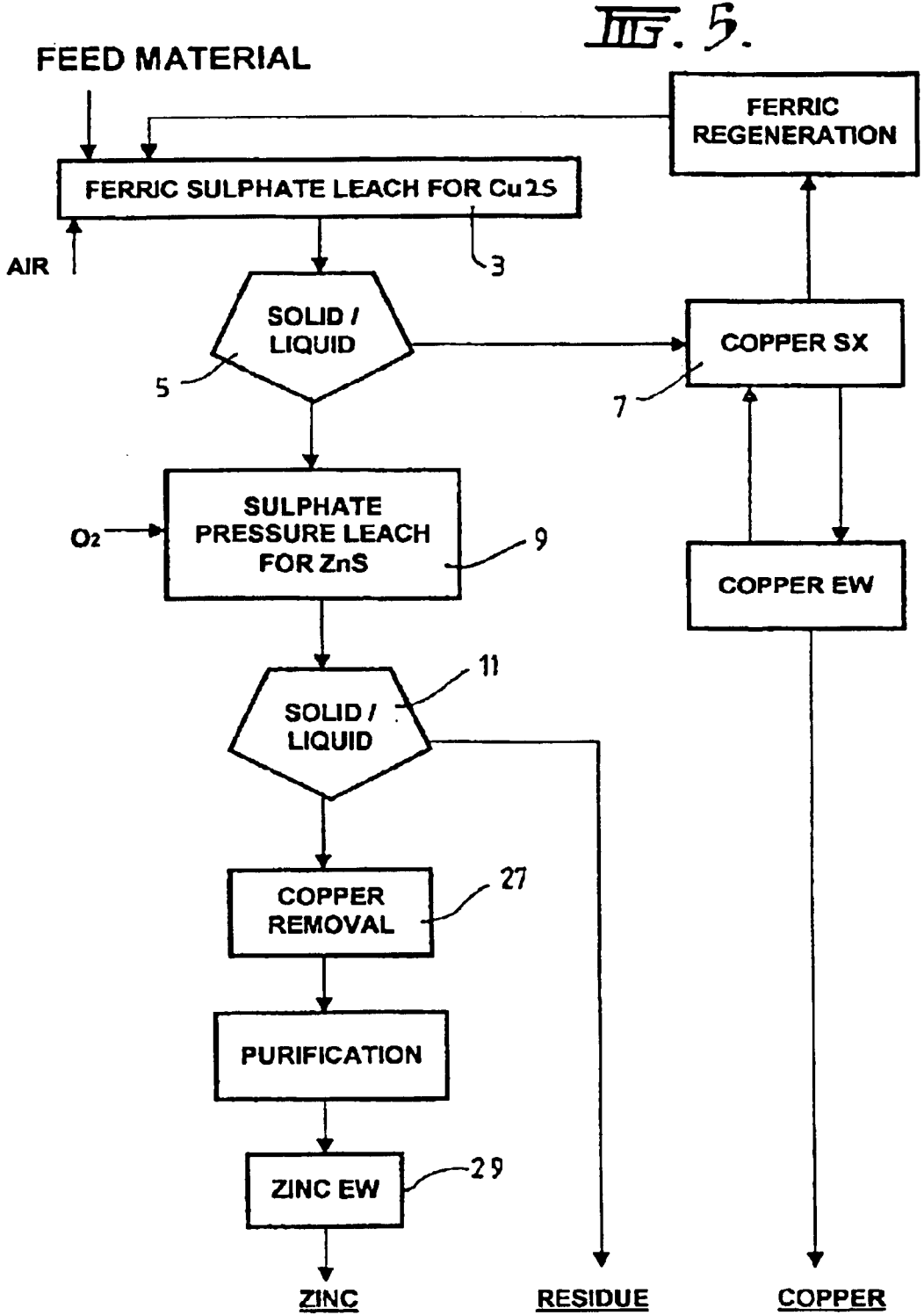

FIG. 5 $Cu_2S$—ZnS feed.
The process includes the ferric sulphate leach followed by the zinc pressure leach.

The underlying technical and economic logic for the above described process methodology is as follows:

1. The ferric sulphate leach system can efficiently extract copper from chalcocite ($Cu_2S$) and solvent extraction can readily transfer copper from low concentration leach liquor into an electrolyte for electrowinning. The solvent extraction reagents are selective for copper and thus also provide the purification step. Pressure leaching in air and/or oxygen can also leach copper from chalcocite but is more expensive in terms of equipment needed and are less selective for copper over other minerals such as sphlalerite and pyrite. The use of pressure is more favoured as a means of regenerating ferric ions from ferrous ions formed during the leach stage as an alternative to bacterial regeneration in cases where suitable bacteria are unavailable and/or the impurities in the feed are toxic to bacteria and render this method unsuitable.

2. The zinc pressure leach can also be used to dissolve copper from these primary sulphide minerals but this can limit the options for the zinc step in terms of needing to balance acidity in the system, and in being able to recover the copper. For feed with significant chalcocite content the separate step is preferred. For feed where chalcocite is not a major copper mineral, the use of a separate ferric sulphate leach may not be warranted with the subsequent leach steps being used to also recover the copper present in this form.

3. Solvent extraction of zinc is not currently attractive given the lack of a cheap selective reagent which is not sensitive to other metals. The ZENECA reagent is currently the most promising but is expensive relative to other reagents and may remain so, cannot tolerate the presence of cupric ions, and needs extra treatment to handle cadmium. These issues coupled with, by comparison to copper, a higher power usage in zinc electrowinning and lower sale price suggest that if the zinc content of a feed is significant then the majority of it should be recovered directly to a sulphate electrolyte. This drives the process towards the sulphate pressure leach for zinc with solvent extraction systems only being used to recover metal from side streams.

4. The use of a chloride-sulphate leach to extract copper from minerals such as chalcopyrite is favoured. This is more expensive than the simple ferric sulphate leach as it requires tonnage oxygen and chloride resistant equipment but does give good dissolution of the minerals which the ferric sulphate leach will not readily attack. It can be carried out under atmospheric conditions but may also be done under elevated pressures to enable higher temperatures (120C) and faster reaction rates. This leach step can selectively dissolve copper without conversion of the sulphur to sulphate and attack on the pyrite as occurs using high temperature (>200C) sulphate pressure leaching. This higher pressure and temperature leaching can be used as an alternative if there is a special need to convert much of the sulphur present to sulphate to provide a source of sulphuric acid. This is a much more expensive leach process and is generally not favoured. Copper in the chloride-sulphate liquor can readily be transferred into a sulphate electrolyte using the same process as for the ferric sulphate leach. This avoids the need for electrowinning from chloride containing liquor as is the case in processes such as the Intec and CLEAR processes. Electrowinning from chloride liquor is complex in terms of needing diaphragm cells, and gives a powder product rather than the conventional cathode sheet obtained from sulphate.

5. The use of a halex leach to recover gold and silver from residues from any one or all of the other leaches overcomes the issue of excessive reagent consumption found when conventional cyanide leaching is used. Residual copper and the presence of elemental sulphur both interfere with normal cyanidisation and have been a barrier to treatment of residues of this type. The halex provides a sufficiently high redox potential to extract gold and maintain it in solution for transfer onto carbon and subsequent recovery. This leach also dissolves silver and any residual copper not extracted in previous leach steps.

6. Using the halex leach only for the residue to recover the precious metals and small amounts of copper avoids concerns on the quality of the copper powder produced and on the efficiently of the electrowinning step by comparison with the conventional sulphate electrowinning. This application of the halex leach-electrowinning step therefore differs from that proposed in the Intec process where it is being used to extract copper directly from chalcopyrite concentrates as the only production route. Using this step primarily for the recovery of gold and silver from the residue from an acid sulphate based leach, the tonnage of metal being produced via this technology is sufficiently small that the use of a chloride-bromide electrowinning step to recover the copper and silver, and to regenerate the halex is acceptable. Attaining a high electrowinning efficiency in this step is not critical to the overall economics as it is only one small part of a much larger situation within the overall economics. In this format the eventual copper product is predominantly conventional electrowon cathode rather than tonnage quantities of powder with the powder being refined to produce conventional refinery cathode.

The following is a more detailed description, by way of example, of the process shown in FIG. 4.

In general terms, the process shown in FIG. 4 includes:
(a) subjecting a concentrate of a copper sulphide ore which contains, chalcopyrite ($CuFeS_2$) and sphalerite (ZnS) to a sulphate pressure leach to extract into solution a substantial proportion of the zinc, and thereafter;
(b) subjecting the solid residue and liquid products of the sulphate pressure leach to largely separate (but to a certain extent interrelated) circuits to extract copper and zinc from the products.

With reference to FIG. 4, the concentrate is supplied to a single stage sulphate pressure leach 33 which extracts into solution greater than 90%, preferably greater than 95%, of the zinc, moderate amounts of copper (preferably<20%)), and relatively low amounts of iron after two hours leaching at 150° C.

The iron reports as goethite or jarosite depending on conditions.

In general terms, the amount of zinc in the solid residue of the concentrate that remains after sulphate pressure leach 33 should be minimised because zinc increases the cost of the subsequent process steps to remove copper from the residue.

The sulphate pressure leach 33 should run with little/no excess acid to achieve a low iron liquor. In addition, the residue may require an acid repulp in the zinc spent electrolyte prior to final separation.

The sulphate pressure leach 33 may also be influenced by the level of formation of plumbo-jarosite and the impact of this on sulphate balance and subsequent treatment. Limestone is an alternative means of removing sulphate, although the residue would probably need to be filtered and washed before passing to the copper circuit to minimise zinc and acid transfer.

The product of sulphate pressure leach 33 is transferred to a solid/liquid separation step 35 which separates the product into a solid residue and a zinc-rich liquor.

The zinc-rich liquor from the solid liquid separation step 35 is transferred to the zinc extraction circuit.

The first step in this circuit is solvent extraction 39 to separate copper from the liquor. Conventional copper solvent extraction reagents can be used to selectively extract the copper from this relatively low acid liquor, and the only issue is the need for reasonable washing to reduce the level of physical zinc carryover into the electrolyte.

The copper-rich liquor from solvent extraction 39 is transferred by line 40 to the copper extraction circuit. This is an optional step and there may be advantages in considering the version of the Cominco process where the pressure sulphate leach is sufficiently acid starved so that copper sulphate is precipitated. This copper sulphate would readily redissolve in the subsequent copper leach in the copper extraction circuit described in more detail below. This may be advantageous if too much of the copper leaches during the sulphate pressure leach as it would reduce the amount of copper to be removed by solvent extraction in the zinc extraction circuit.

The exact arrangement of whichever option is chosen will depend upon leach behaviour and on the preferred means of separating the residue. The BHAS process uses a simple two stage leach with the second step being at high solids and high acid to enhance recovery in a short residence time. The decision on whether or not to attempt to recover lead and precious metals strongly influences whether to make a single residue or whether there are advantages in producing a separate iron residue. Arranging the leach circuit to minimise plumbo-jarosite formation may be important if residue treatment is included. The flow sheet gives the simplest version as a base case.

The equipment size and hence costs is largely set by the volumetric flow and there are advantages in running high zinc and copper pickup in the process. The main limitation on this is the transfer capability of the solvent extraction steps.

The zinc-rich, copper-depleted liquor from solvent extraction 39 is subjected to conventional zinc dust purification 41 and electrowinning 42 to recover zinc. Depending upon the amount of copper removed in the solvent extraction step 39, and the acid generated, a small amount of neutralisation may also be needed to avoid excessive zinc dust usage. This would preferably be done using zinc scrap or zinc oxide unless they were unavailable and/or there was a need to also remove some excess sulphate in which case limestone and/or lime would be preferred.

The solid residue from sulphate pressure leach 33 is transferred to the copper extraction circuit.

The first step in this circuit is a chloride sulphate leach 37 which dissolves copper from the chalcopyrite the solid residue without significant attack on pyrite and without significant sulphate formation. The leach is carried out with continuous oxygen injection at around 90–110° C. The options for the leach are an atmospheric or low pressure version using higher chloride (15–60 g/l) based on the BHAS process or with greater pressure assistance at lower chloride levels (10–15 g/l) as piloted and patented by Cominco. Both of these options have been shown to give high copper extractions in laboratory tests.

After solid/liquid separation 38, the copper-rich, zinc-depleted pregnant liquor is fed to solvent extraction 15 to selectively transfer copper to a chloride free electrolyte.

The copper-rich liquor from solvent extraction 45 is transferred to electrowinning 50 to recover copper.

The copper-depleted liquor from solvent extraction 45 is split into a return stream that is transferred from by line 47 to the chloride sulphate leach 37 and a stream that is transferred by line 49 for treatment to remove zinc and to maintain sulphate and impurities balance. The bleed stream is passed through copper removal 50 and then solvent extraction 51 to separate zinc from the liquor. Any suitable means, such as solvent extraction, sulphidisation or cementation, may be used to remove copper. The low copper/zinc liquor stream is neutralised and discharged or recycled depending on overall water balance.

The proportions of each stream depend on the efficiency of zinc extraction in sulphate pressure leach 33, and in the level of washing of the residue. Zinc solvent extraction 32 is not commonly practised commercially because of the high cost and poor pickup and selectivity of the available reagents.

Both copper electrowinning 50 and zinc electrowinning 42 are based on commonly practised conventional technology. The electrolytes generated through the copper and zinc circuits are selected to give high grade products. The process does not include specific halide or manganese removal steps but these may need consideration dependant upon the ore composition and water quality.

The solid residue from solid/liquid separation 43 is either neutralised and dumped or treated to recover any unleached Cu/Zn sulphides for recycle, and to produce a lead bullion containing the precious metals for sale. An alternative approach is to use flotation to remove the sulphur and sulphides, possibly selectively, followed by arc furnace matte/bullion smelting.

Many modifications may be made to the process of the present invention described above without departing from the spirit and scope of the invention.

What is claimed is:

1. A hydrometallurgical process for extracting copper and any one or more than one of zinc, silver and gold from a sulphide ore or concentrate which includes a range of mineral species that contain copper and one or more than one of zinc, silver and gold, which process includes two or more than two leach steps using leach liquors of different composition, each leach step selectively leaching one or more than one metal from the minerals, separating a solid residue and an exit leach liquor after each leach step, leaching the solid residue produced in each leach step in a successive leach step, and recovering metal from the exit leach liquor produced in each leach step, and wherein one of the leach steps includes an oxidative acid sulphate high pressure leach carried out at over 200° C. which converts to sulphate much of the sulphur present in the sulphide ore or concentrate or the solid residue of a previous leach step and extracts copper and zinc.

2. The process defined in claim 1 includes 2 or more of the leach steps which are tailored to selectively attack minerals so that each metal is recovered through a leach step or steps that is suitable to the minerals and the leach steps are complimentary in terms of allowing materials transfer between them without one step being detrimental to and seriously interfering with the next step.

3. The process defined in claim 1 includes a ferric sulphate leach which extracts copper from chalcocite ($Cu_2S$) in the sulphide ore or concentrate or the solids residue of a previous leach step.

4. The process defined in claim 3 includes selecting the time, temperature and oxygen potential of the ferric sulphate leach to leach copper over zinc.

5. The process defined in claim 3 includes carrying out a solids/liquid separation step after the ferric sulphate leach and forming a solid residue and an exit leach liquor.

6. The process defined in claim 5 includes recovering copper from the exit leach liquor.

7. The process defined in claim 1 includes a pressure oxidation leach in acid sulphate media with oxygen injection which extracts zinc from sphalerite ($ZnS$) in the sulphide ore or concentrate or the solid residue of a previous leach step.

8. The process defined in claim 7 includes carrying out the pressure oxidation leach at a temperature in the range of 140 to 160° C.

9. The process defined in claim 7 includes carrying out a Solids/liquid separation step after the pressure oxidation leach and forming a solid residue and an exit leach liquor.

10. The process defined in claim 9 includes recovering zinc from the exit leach liquor.

11. The process defined in claim 1 includes a mixed chloride-sulphate leach which extracts copper from refractory sulphide minerals in the sulphide ore or concentrate or the solid residue of a previous leach step.

12. The process defined in claim 11 including carrying out the chloride-sulphate leach with oxygen injection at 80 to 125° C.

13. The process defied in claim 12 includes carrying out the chloride sulphate leach at atmospheric or low pressure with a chloride level of 5 to 60 g/l.

14. The process defined in claim 12 includes carrying out the chloride-sulphate leach at high pressure with a chloride level of 5 to 15 g/l.

15. The process defined in claim 11 includes carrying out a solids/liquid separation and forming a solid residue and an exit leach liquor.

16. The process defined in claim 15 includes recovering copper from the exit leach liquor.

17. The process defined in claim 1 includes carrying out a solids/liquid separation after the oxidative acid sulphate high pressure leach and forming a solid residue and an exit leach liquor.

18. The process defined in claim 17 includes recovering copper and zinc from the exit leach liquor.

19. The process defined in claim 1 includes a halogen extraction leach which extracts copper, silver and gold from the sulphide ore or concentrate or the solid residue of a previous leach step.

20. The process defined in claim 19 includes carrying out a solids/liquid separation and forming a solid residue and an exit leach liquor.

21. The process defined in claim 20 includes recovering copper, silver and gold from the exit leach liquor.

22. A hydrometallurgical process for extracting copper and any one or more than one of zinc, silver and gold from a sulphide ore or concentrate which includes a range of mineral species that contain copper and one or more than one of zinc, silver and gold, which process includes two or more than two leach steps using leach liquors of different composition, each leach step selectively leaching one or more than one metal from the minerals, separating a solid residue and an exit leach liquor after each leach step, leaching the solid residue produced in each leach step in a successive leach step, and recovering metal from the exit leach liquor produced in each leach step, and wherein one of the leach steps includes a mixed chloride-sulphate leach with oxygen injection at 80 to 125° C. at atmospheric or low pressure with a chloride level of 5 to 60 g/l which extracts copper from refractory sulphide minerals in the sulphide ore or concentrate or the solid residue of a previous leach step.

23. The process defined in claim 22 includes 2 or more of the leach steps which are tailored to selectively attack minerals so that each metal is recovered through a leach step or steps that is suitable to the minerals and the leach steps are complementary in terms of allowing materials transfer between them without one step being detrimental to and seriously interfering with the next step.

24. The process defined in claim 22 includes a ferric sulphate leach which extracts copper from chalcocite ($Cu_2S$) in the sulphide ore or concentrate or the solids residue of a previous leach step.

25. The process defined in claim 24 includes selecting the time, temperature and oxygen potential of the ferric sulphate leach to leach copper over zinc.

26. The process defined in claim 24 includes carrying out a solids/liquid separation step after the ferric sulphate leach and forming a solid residue and an exit leach liquor.

27. The process defined in claim 26 includes recovering copper from the exit leach liquor.

28. The process defined in claim 22 includes a pressure oxidation leach in acid sulphate media with oxygen injection which extracts zinc from sphalerite ($ZnS$) in the sulphide ore or concentrate or the solid residue of a previous leach step.

29. The process defined in claim 28 includes carrying out the pressure oxidation leach at a temperature in the range of 140 to 160° C.

30. The process defined in claim 28 includes carrying out a solids/liquid separation step after the pressure oxidation leach and forming a solid residue and an exit leach liquor.

31. The process defined in claim 30 includes recovering zinc from the exit leach liquor.

32. The process defined in claim 22 includes carrying out the chloride-sulphate leach at high pressure within a chloride level of 5 to 15 g/l.

33. The process defined in claim 22 includes carrying out a solids/liquid separation after the chloridesulphate leach and forming a solid residue and an exit leach liquor.

34. The process defined in claim 33 includes recovering copper from the exit leach liquor.

35. The process defined in claim 22 includes an oxidative acid sulphate high pressure leach cared out at over 200° C. which converts to sulphate much of the sulphur present in the sulphide ere or concentrate or the solid residue of a previous leach step and extracts copper and zinc.

36. The process defined in claim 35 includes carrying out a solids/liquid separation and forming a solid residue and an exit leach liquor.

37. The process defined in claim 36 includes recovering copper and zinc from the exit leach liquor.

38. The process defined in claim 23 includes a halogen extraction leach which extracts copper, silver and gold from the sulphide ore or concentrate or the solid residue of a previous leach step.

39. The process defined in claim 38 includes carrying out a solids/liquid separation and forming a solid residue and an exit leach liquor.

40. The process defined in claim 39 includes recovering copper, silver and gold from the exit leach liquor.

41. A hydrometallurgical process for extracting copper and any one or more than one of zinc, silver and gold from a sulphide ore or concentrate which includes a range of mineral species that contain copper and one or more than one of zinc, silver and gold, which process includes two or more than two leach steps using leach liquors of different composition, each leach step selectively leaching one or more than one metal from the minerals, separating a solid residue and an exit leach liquor after each leach step, leaching the solid residue produced in each leach step in a successive leach step, and recovering metal from the exit leach liquor produced in each leach step, and wherein the two or more leach steps comprise two or more of the following:
  a) a ferric sulphate leach which extracts copper from chalcocite ($Cu_2S$) in the sulphide ore or concentrate or the solid residue of a previous leach step;
  b) a mixed chloridesulphate leach which extracts copper from refractory sulphide minerals in the sulphide ore or concentrate or the solid residue of a previous leach step;
  c) a halogen extraction leach which extracts copper, silver and gold from the sulphide ore or concentrate or the solid residue of a previous leach step; and
  d) an oxidative acid sulphate high pressure leach carried out at over 200° C. which converts to sulphate much of the sulphur present in the sulphide ore or concentrate or the solid residue of a previous leach step and extracts copper and zinc.

42. The process defined in claim 41 wherein one of the leach steps is the ferric sulphate leach that includes selecting the time, temperature and oxygen potential of the ferric sulphate leach to leach copper over zinc.

43. The process defined in claim 42 includes carrying out a solids/liquid separation step after the ferric sulphate leach and forming a solid residue and an exit leach liquor.

44. The process defined in claim 43 includes recovering copper from the exit leach liquor.

45. The process defined in claim 41 wherein one of the leach steps is the mixed chloride-sulphate leach that includes carrying out the chloride-sulphate leach with oxygen injection at 80 to 125° C.

46. The process defined in claim 45 includes carrying out the chloride-sulphate leach at atmospheric or low pressure with a chloride level of 5 to 60 g/l.

47. The process defined in claim 45 includes carrying out the chloride sulphate leach at high pressure with a chloride level of 5 to 15 g/l.

48. The process defined in claim 45 includes carrying out a solids/liquid separation and forming a solid residue and an exit leach liquor.

49. The process defined in claim 48 includes recovering copper from the exit leach liquor.

50. The process defined in claim 41 wherein one of the leach steps is the halogen extraction leach that includes carrying out a solids/liquid separation and forming a solid residue and an exit leach liquor.

51. The process defined in claim 50 includes recovering copper, silver and gold from the exit leach liquor.

52. The process defined in claim 41 wherein one of the leach steps is the oxidative acid sulphate high pressure leach that includes carrying out a solids/liquid separation after the oxidative acid sulphate high pressure leach and forming a solid residue and an exit leach liquor.

53. The process defined in claim 52 includes recovering copper and zinc from the exit leach liquor.

54. A hydrometallurgical process for extracting copper and any one or more than one of zinc, silver and gold from a sulphide ore or concentrate which includes a range of mineral species that contain copper and one or more than one of zinc, silver and gold, which process includes two or more than two leach steps using leach liquors of different composition, each leach step selectively leaching one or more than one metal from the minerals, separating a solid residue and an exit leach liquor after each leach step, leaching the solid residue produced in each leach step in a successive leach step, and recovering metal from the exit leach liquor produced in each leach step, and wherein the two or more leach steps comprise two or more of the following:
  a) a pressure oxidation leach in acid sulphate media with oxygen injection which extracts zinc from sphalerite (ZnS) in the sulphide ore or concentrate or the solid residue of a previous leach step;
  b) a mixed chloride-sulphate leach which extracts copper from refractory sulphide minerals in the sulphide ore or concentrate or the solid residue of a previous leach step;
  c) a halogen extraction leach which extracts copper, silver and gold from the sulphide ore or concentrate or the solid residue of a previous leach step; and
  d) an oxidative acid sulphate high pressure leach carried out at over 200° C. which converts to sulphate much of the sulphur present in the sulphide ore or concentrate or the solid residue of a previous leach step and extracts copper and zinc.

55. The process of claim 34 wherein one of the leach steps is the pressure oxidation leach that includes carrying out the pressure oxidation leach at a temperature in the range of 140 to 160° C.

56. The process defined in claim 55 includes carrying out a solids/liquid separation step after the pressure oxidation leach and forming a solid residue and an exit leach liquor.

57. The process defined in claim 56 includes recovering zinc from the exit leach liquor.

58. The process defined in claim 54 wherein one of the leach steps is the mixed chloride-sulphate leach that includes carrying out the chloride-sulphate leach with oxygen injection at 80 to 125° C.

59. The process defined in claim 58 includes carrying out the chloride-sulphate leach at atmospheric or low pressure with a chloride level of 5 to 60 g/l.

60. The process defined in claim 58 includes carrying out the chloride-sulphate leach at high pressure with a chloride level of 5 to 15 g/l.

61. The process defined in claim 58 includes carrying out a solids/liquid separation and forming a solid residue and an exit leach liquor.

62. The process defined in claim 61 includes recovering copper from the exit leach liquor.

63. The process defined in claim 54 wherein one of the leach steps is the halogen extraction leach that includes carrying out a solids/liquid separation and forming a solid residue and an exit leach liquor.

64. The process defined in claim 63 includes recovering copper, silver and gold from the exit leach liquor.

65. The process defined in claim 54 wherein one of the leach steps is the oxidative acid sulphate high pressure leach that includes carrying out a solids/liquid separation after the oxidative acid sulphate high pressure leach and forming a solid residue and an exit leach liquor.

66. The process defined in claim 65 includes recovering copper and zinc from the exit leach liquor.

67. A hydrometallurgical process for extracting copper and any one or more than one of zinc, silver and gold from a sulphide ore or concentrate which includes a range of mineral species that contain copper and one or more than one of zinc, silver and gold, which process includes two or more than two leach steps using leach liquors of different composition, each leach step selectively leaching one or more than one metal from the minerals, separating a solid residue and an exit leach liquor after each leach step, leaching the solid residue produced in each leach step in a successive leach step, and recovering metal from the exit leach liquor produced in each leach step, and wherein two of the leach steps comprise:
  a) a ferric sulphate leach which extracts copper from chalcocite ($Cu_2S$) in the sulphide ore or concentrate or the solid residue of a previous leach step;
  b) a pressure oxidation leach in acid sulphate media with oxygen injection which extracts zinc from sphalerite (ZnS) in the sulphide ore or concentrate or the solid residue of a previous leach step;
and the leach steps further comprise one or more of the following additional leach steps:
  c) a halogen extraction leach which extracts copper, silver and gold from the sulphide ore or concentrate or the solid residue of a previous leach step; and
  d) an oxidative acid sulphate high pressure leach carried out at over 200° C. which converts to sulphate much of the sulphur present in the sulphide ore or concentrate or the solid residue of a previous leach step and extracts copper and zinc.

68. The process defined in claim 67 wherein the ferric sulphate leach includes selecting the time, temperature and oxygen potential of the ferric sulphate leach to leach copper over zinc.

69. The process defined in claim 67 includes carrying out a solids/liquid separation step after the ferric sulphate leach and forming a solid residue and an exit leach liquor.

70. The process defined in claim 69 includes recovering copper from the exit leach liquor.

71. The process of claim 67 wherein the pressure oxidation leach includes carrying out the pressure oxidation leach at a temperature in the range of 140 to 160° C.

72. The process defined in claim 67 includes carrying out a solids/liquid separation step after the pressure oxidation leach and forming a solid residue and an exit leach liquor.

73. The process defined in claim 78 includes recovering zinc from the exit leach liquor.

74. The process defined in claim 67 wherein one of the additional leach steps is the halogen extraction leach that includes carrying out a solids/liquid separation and forming a solid residue and an exit leach liquor.

75. The process defined in claim 74 includes recovering copper, silver and gold from the exit leach liquor.

76. The process defined in claim 67 wherein one of the additional leach steps is the oxidative acid sulphate high pressure leach that includes carrying out a solids/liquid separation after the oxidative acid sulphate high pressure leach and forming a solid residue and an exit leach liquor.

77. The process defined in claim 76 includes recovering copper and zinc from the exit leach liquor.

* * * * *